United States Patent [19]
Havins

[11] Patent Number: 5,121,554
[45] Date of Patent: Jun. 16, 1992

[54] APPARATUS AND METHOD FOR CUTTING PRECISION ANGLES

[76] Inventor: Billy M. Havins, 17655 Northfalk, Houston, Tex. 77084

[21] Appl. No.: 680,377

[22] Filed: Apr. 4, 1991

[51] Int. Cl.⁵ .......................... B27B 5/20; G01B 5/24
[52] U.S. Cl. ...................................... 33/640; 33/202; 83/471.3; 30/376
[58] Field of Search .................. 33/640, 201, 202, 534, 33/628, 626, 424, 613, 645, 632, 633, 634, 641, 642; 83/471.3, 486.1; 30/376

[56] References Cited

U.S. PATENT DOCUMENTS

| | | | |
|---|---|---|---|
| 2,700,993 | 2/1955 | Pence | 33/628 |
| 2,884,965 | 5/1959 | Stahl | 33/640 |
| 3,731,572 | 5/1973 | Crooks | 83/471.3 |
| 4,537,105 | 8/1985 | Bergler | 83/471.3 |
| 4,843,728 | 7/1989 | Francis | 33/640 |
| 4,945,799 | 8/1990 | Knetzer | 83/471.3 |
| 4,957,024 | 9/1990 | Albrecht | 83/471.3 |
| 5,042,542 | 8/1991 | Purviance | 33/201 |

*Primary Examiner*—William A. Cuchlinski, Jr.
*Assistant Examiner*—C. W. Fulton
*Attorney, Agent, or Firm*—Kenneth A. Roddy

[57] ABSTRACT

An adjustable miter gage apparatus and method for making precision miter cut angles with conventional radial arm saws, table saws, band saws, router tables, and other woodworking machines. The miter gage apparatus utilizes a flat base or table top with a large radius arc thereon and adjustable gages located on the circumference of the arc. The apparatus acts as a large protractor and allows the cutting angle to be accurately adjusted relative to the actual angle at which the saw blade is initially positioned by the woodworking machine. The adjustable gages have set screws threadedly mounted therein for making fine adjustments and may be permanently or removably installed on the base or table top. The set screw threads and radius of the arc are related such that turning the set screw will increase or decrease the angle to within a fraction of a degree. A preliminary angle setting is made using the existing miter scale on the woodworking machine. A trial cut is made and measured with a protractor device and the correction angle is determined. The set screw of an adjustable gage is positioned in contact with the saw blade or the fence and is adjusted by turning the set screw to increase or decrease the angle. After the cut angle has been adjusted, an adjustable gage may be installed at the corrected angle location on the arc. Several gages may be permanently installed at commonly used angles, whereby subsequent precision cut angles are easily and quickly retrieved.

16 Claims, 3 Drawing Sheets

U.S. Patent  June 16, 1992  Sheet 1 of 3  5,121,554
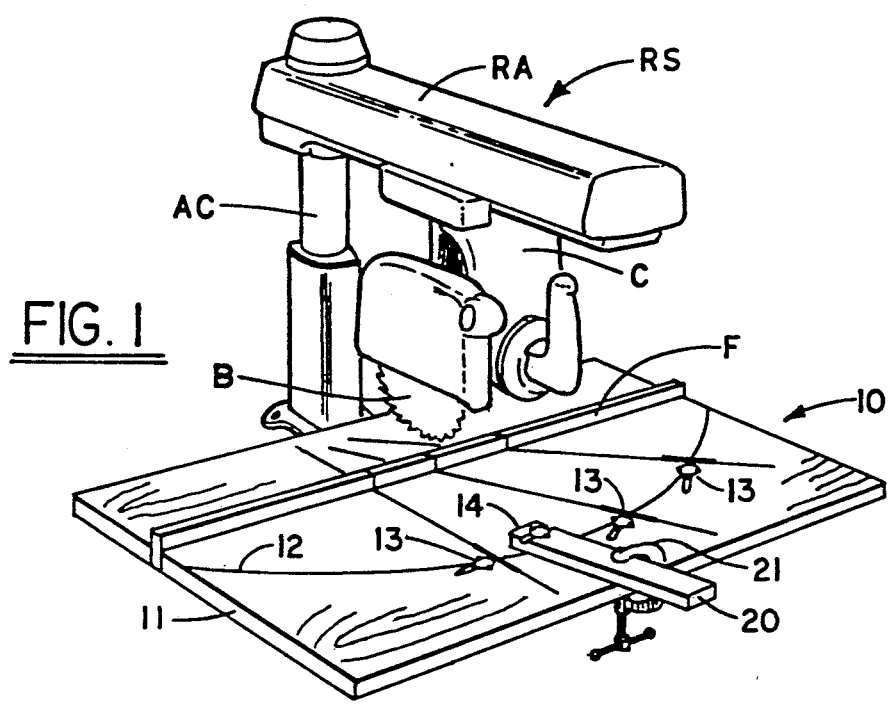
FIG. 1
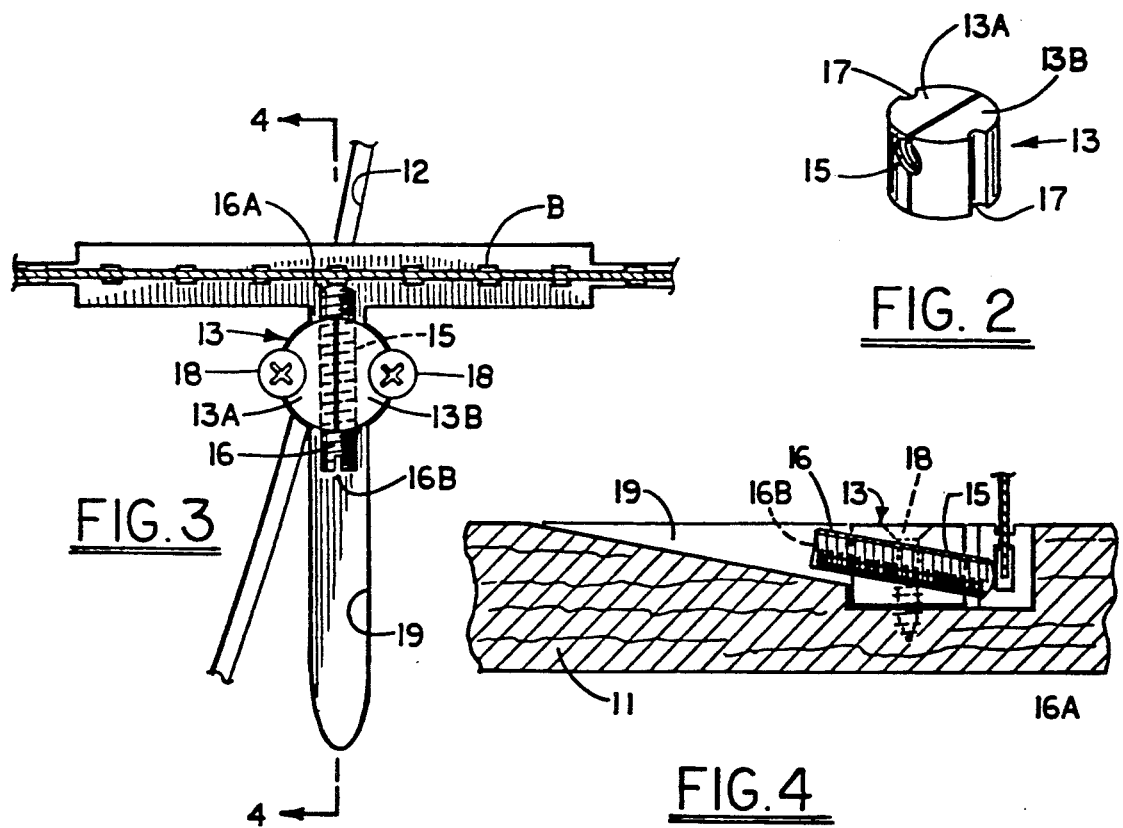
FIG. 2
FIG. 3
FIG. 4

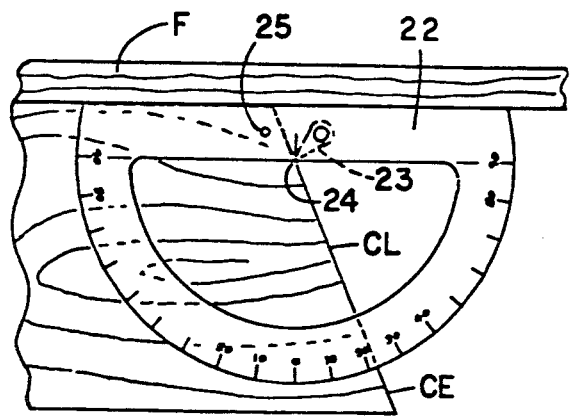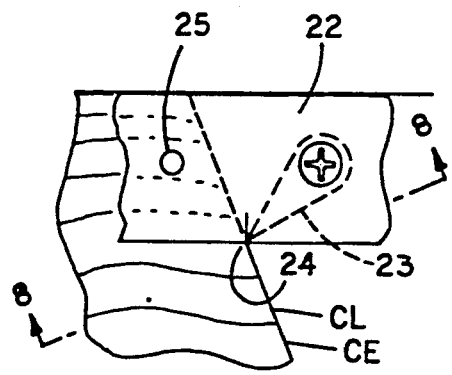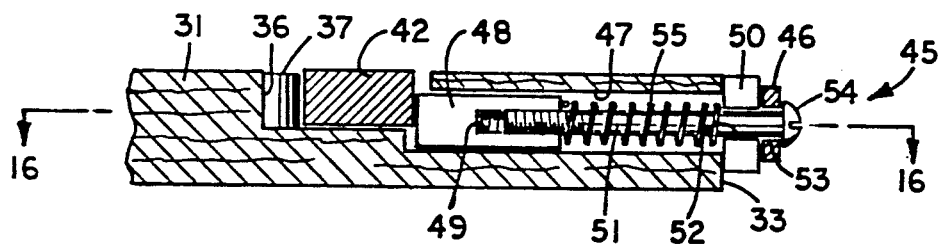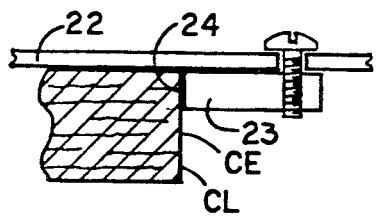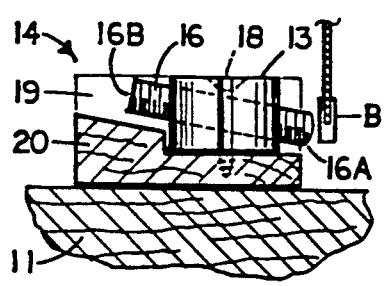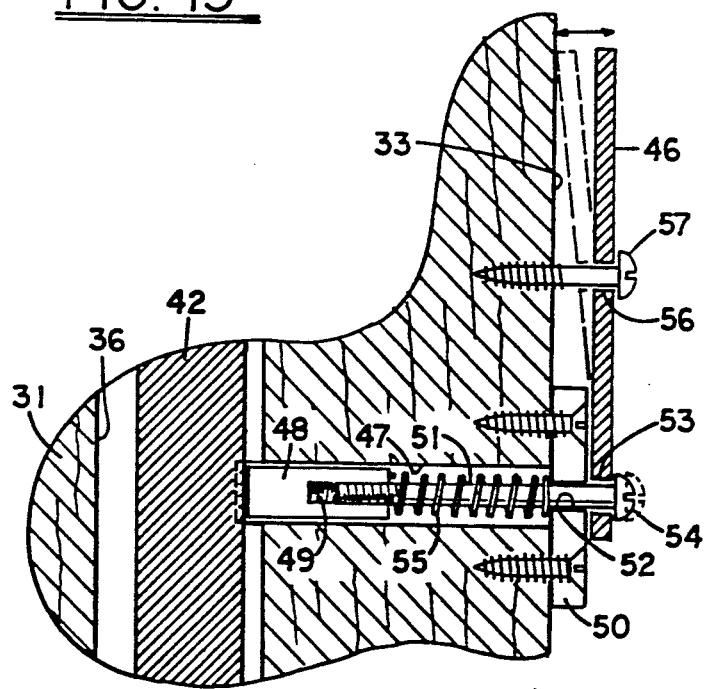

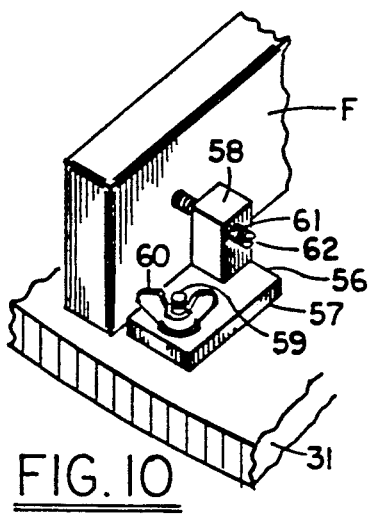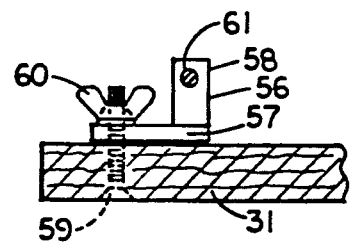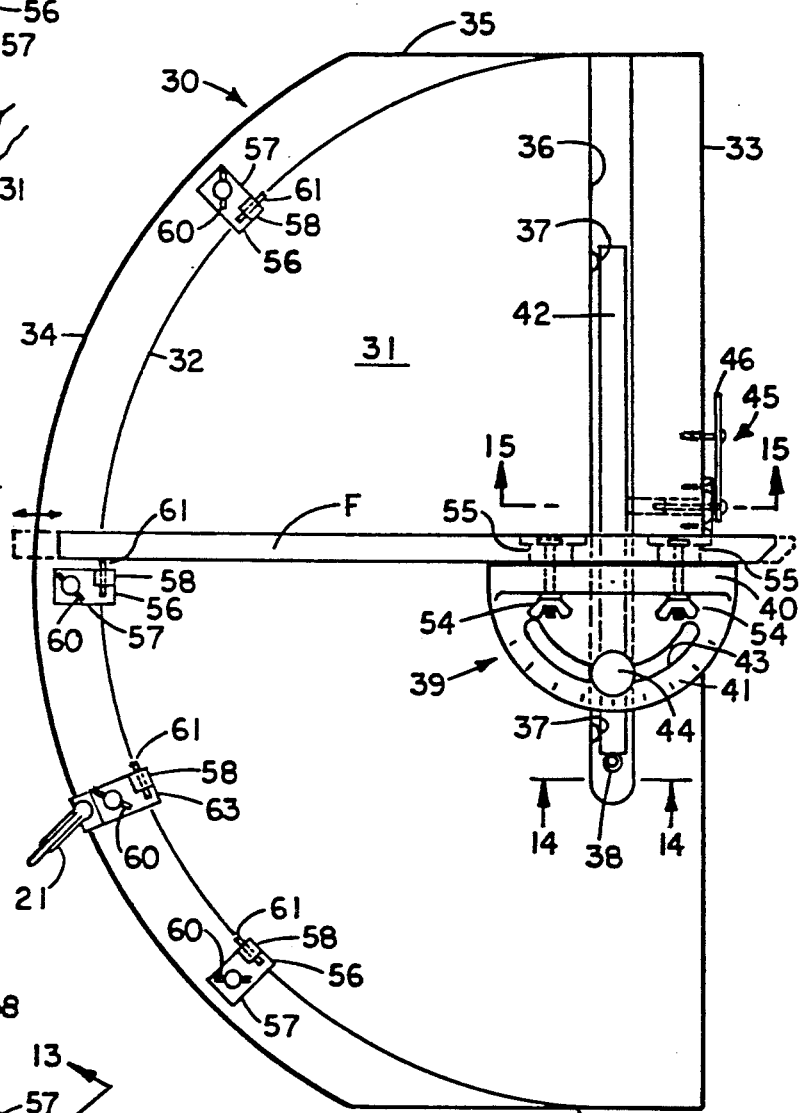

APPARATUS AND METHOD FOR CUTTING PRECISION ANGLES

BACKGROUND OF THE INVENTION

1. Field of the Invention

This invention relates generally to wood cutting apparatus, and more particularly to an adjustable miter gage apparatus and method for making precision miter cut angles with conventional radial arm saws, table saws, band saws, router tables, and other woodworking machines by utilizing a flat base or table top having a large radius arc with adjustable gages located thereon which acts as a large protractor and allows the cutting angle to be accurately adjusted relative to the actual angle at which the saw blade is initially positioned by the machine.

2. Brief Description of the Prior Art

In general, low to moderately high cost radial arm and table saws are incapable of accommodating a precision miter adjustment. In the case of the radial arm saw, the mechanism that allows the radial arm to swing in an arc to cut a miter also prevents it from doing it well. The accuracy of the miter angle that can be set depends on the clearance, or free play in the swing arm mechanism and the ability of the operator to read a small and inaccurate miter degree scale. The swing arm mechanism must have some clearance and tolerances built in so that the arm can be raised and/or rotated. When the mechanism having free play is located very near the swing arm column, a very small clearance will allow the outer end of the radial arm to rotate through a relatively larger arc.

For example, if the swing mechanism is located 1¾" from the center of the column, a total clearance of 0.015" would allow the outer end of a 24" swing arm to move about 3/16" or rotate through ¼°. If the swing mechanism were located 24" away from the center of the column, the same 0.015" clearance would allow only 1/32° rotation. If the operator were to attempt a ⅛° correction, that ⅛° correction could be completely absorbed in the free play of the swing mechanism. As a result, conventional radial arm saws are not reliable for making miter cuts, except for the most liberal requirements.

In the case of the table saw, the standard miter gage does not have the capability of fine adjustments and any adjustment will be compromised by any error in the 90° prealignment of the miter gage to the miter gage slot.

The radial arm saw for sure, and the table saw to some extent have structures that can be dimensionally unstable that could compromise adjustments that are transferred through these structures. These compromised adjustments are probably ignored or not noticed for work that does not require close tolerance. For close tolerance work, these adjustments become unreliable A common practice to overcome these problems in the table saw is to use an adjustable drafting triangle to align the miter gage with the plane of the saw blade. However, the plane of the saw blade may not be parallel to the miter gage slot if the arbor is bent, the blade is warped, or if the arbor is not aligned 90° from the miter slot.

A radial arm saw having a digital miter cut angle readout has recently been introduced commercially. The digital readout only shows angles in ¼° increments. Like most other radial saws, it has miter stops at 90° and at 45°. When the radial arm is moved to one of these stops, the stop pin will engage and the readout will show 90° or 45°. However, with the stop pin engaged and before applying the radial arm clamp, the radial arm can be moved through a small angle (about ⅛-⅜ of a degree) without a corresponding indication on the readout. Thus, the adjustment tolerance is not much better than ±⅛° due to the inherent tolerances through the radial arm and column mechanisms.

There are several patents which disclose various saw attachments and apparatus.

Pease, U.S. Pat. No. 3,586,077 discloses an elongated plate-like bar having a longitudinal groove for use as a guide for portable power saws.

Stocker, U.S. Pat. No. 3,645,307 power saw guide having a base frame adapted to be clamped to a work table and includes an elongate guide rail adapted for adjustment about a vertical axis. A saw carriage is roller supported on the rail for longitudinal movements.

Dalton, U.S. Pat. No. 3,903,600 discloses a dove tail guide bar slidable within the base plate of an electric saw which includes an adjustable mitre gauge, a spring with a steel point for keeping the saw from vibrating off mark, and a clamp secured on the end of the guide bar securing the guide bar to the material being sawed. The device further includes and angle adjustment for angular saw cuts relative to a vertical axis.

Beekenkamp, U.S Pat. No. 4,062,390 discloses a pair of vice members mounted on a supporting structure which are disposed in side-by-side relation for clamping a track member therebetween. An elongated workpiece guide is pivotally mounted to the track member for angularly positioning the workpiece in the path defined by the track member and a sled slides in the track member and carries a portable saw or router.

Sheps et al, U.S. Pat. No. 4,335,512 discloses a pair of elongate relatively slidable guides for guiding a portable handheld power saw.

The present invention is distinguished over the prior art in general, and these patents in particular by an adjustable miter gage apparatus and method for making precision miter cut angles with conventional radial arm saws, table saws, band saws, router tables, and other woodworking machines having a miter gage by utilizing a flat base or table top having a large radius arc with adjustable gages located thereon which acts as a large protractor and allows the cutting angle to be accurately adjusted relative to the actual angle at which the saw blade is initially positioned by the machine. The present miter gage apparatus does not require angular pre-alignment between the miter gage apparatus and the woodworking machine and does not require the woodworking machine to be in correct pre-alignment.

SUMMARY OF THE INVENTION

It is therefore an object of the present invention to provide a miter gage apparatus and method which directly measures the true cut line angle that exists only on the cut edge of a work piece.

It is another object of this invention to provide a miter gage apparatus and method which corrects the actual cut line angle to the desired cut line angle.

Another object of this invention is to provide a miter gage apparatus and method which stores an adjusted desired cut line angle for later use.

Another object of this invention is to provide a miter gage apparatus and method which is functionally independent of the radial arm miter and swing mechanism of the saw.

Another object of this invention is to provide a miter gage apparatus which may be factory installed on new saw machinery at low cost.

Another object of this invention is to provide a miter gage apparatus which can be installed on any existing radial arm saw having adequate table top area.

Another object of this invention is to provide a miter gage apparatus which can be installed on existing radial arm saws with simple tools and with low skill requirements.

Another object of this invention is to provide a miter gage apparatus which does not require precision parts and precision location on the table top.

Another object of this invention is to provide a miter gage apparatus which does not require angular prealignment between the miter gage apparatus and the woodworking machine and does not require the woodworking machine to be in correct prealignment.

A further object of this invention is to provide a miter gage apparatus which is simple to operate.

A still further object of this invention is to provide a miter gage apparatus which is simple in construction, economical to manufacture, and accurate and reliable in use.

Other objects of the invention will become apparent from time to time throughout the specification and claims as hereinafter related.

The above noted objects and other objects of the invention are accomplished by an adjustable miter gage apparatus and method for making precision miter cut angles with conventional radial arm saws, table saws, band saws, router tables, and other woodworking machines having a miter gage by utilizing a flat base or table top having a large radius arc with adjustable gages located thereon which acts as a large protractor and allows the cutting angle to be accurately adjusted relative to the actual angle at which the saw blade is initially positioned by the machine.

BRIEF DESCRIPTION OF THE DRAWINGS

FIG. 1 is a perspective view of a radial arm saw having a miter gage apparatus in accordance with the present invention installed thereon.

FIG. 2 is an isometric view of a permanent gage member used in the miter gage apparatus.

FIG. 3 is a top plan view of a portion of the table top having a permanent gage member installed therein.

FIG. 4 is a cross section of the permanent gage installed in the table top taken along line 4—4 of FIG. 3.

FIG. 5 is a cross section of a clamp-on gage having a screw member engaged with the blade of the saw.

FIG. 6 is a top plan view of a protractor device placed on a board after a trial cut.

FIG. 7 is an enlarged top plan view of the radial line stop member of the protractor device of FIG. 6 engaged on the cut edge of the board after a trial cut.

FIG. 8 is a cross section taken along line 8—8 of FIG. 7 showing the radial line stop member engaged on the cut edge of the board after a trial cut.

FIG. 9 is a top plan view of a table saw miter gage apparatus having a base with a protractor device in accordance with the present invention.

FIG. 10 is an isometric view of a permanent gage member of the miter gage engaged with a fence member.

FIG. 11 is a cross section of the permanent gage installed on the base member taken along line 11—11 of FIG. 10.

FIG. 12 is an isometric view of a temporary clamp-on gage member of the miter gage apparatus.

FIG. 13 is a cross section of the temporary clamp-on gage clamped on the base member taken along line 13—13 of FIG. 12.

FIG. 14 is a cross section of the miter gage bar of the miter gage device taken along line 14—14 of FIG. 9.

FIG. 15 is a cross section through the plunger mechanism of the miter gage device taken along line 15—15 of FIG. 9.

FIG. 16 is a cross section through the plunger mechanism of the miter gage device taken along line 16—16 of FIG. 15.

DESCRIPTION OF A PREFERRED EMBODIMENT FOR RADIAL ARM SAWS

Referring to the drawings by numerals of reference, there is shown in FIG. a conventional radial arm saw RS having a preferred miter gage apparatus 10 installed thereon for use in performing precise angular cuts. The conventional radial arm saw RS has the usual vertical arm column AC, radial arm RA, and saw carriage C. The miter gage apparatus 10 for use with radial saws comprises four major components; a table top 11 having an arc or degree circle 12 cut therein, one or more permanent adjustable gages 13, a clamp-on adjustable gage 14, and a protractor device 22 (described hereinafter).

The table top 11 may be purchased as a ready made unit for installation on the frame of the radial saw, or the existing table top may be modified. The table top of the present invention is prepared by cutting a 1/16" deep groove in the top surface of the table top on a relatively large radius. A preferred radius is suggested to be 1'-10 15/16". The groove forms an arc or degree circle 12 on which the adjustable gages 13 and 14 will be located. If the existing table top is used, the groove 12 may be cut using the existing radial saw and swinging the radial arm RA around at the predetermined radius. The arc or degree circle 12 has the radius center located at the center of the radial arm column AC. The radius can be any dimension, but preferably the radius would be as large as the table top would accommodate and also provide a practical adjustment mode for the adjustment gages.

As best seen in FIGS. 2, 3, and 4, a preferred adjustable gage 13 is a cylindrical member formed of two halves 13A and 13B which has a threaded bore 15 extending transversly through the two halves in the plane of the line of separation. In other words, each half carries one-half of the diameter of the threaded bore 15. The threaded bore 15 extends transversly through the two halves at an angle of approximately 10° relative to horizontal. A preferred adjustable gage 13 is approximately ¾" in diameter and approximately ¾" long and may be injection molded.

A set screw 16 is threadedly received in the threaded bore 15 to extend outwardly from each side of the adjustment gage 13. A preferred set screw is a ¼" dia - 20×1 ¼" long set screw having rounded tip 16A at one end and an allen wrench socket or screw driver slot 16B at the other end. Placing the set screw 16 at approximately 10° relative to horizontal provides access at the top end and allows the screw tip to extend below the normal running depth of the saw blade at the lower end.

Each half of the adjustable gage 13 may also have a ⅛" wide ×1/16" deep vertical groove 17 formed on its exterior to act as a drill guide for mounting as described below.

The permanent adjustable gages 13 are installed by drilling a ¼" dia. ×9/16" deep hole in the table top 11. The two halves 13A and 13B are assembled together with the set screw 16 and inserted into the hole. Shims may be used to level the top of the gage 13 with the table top surface. The gage 13 is secured to the table top by drilling guide screw holes at the guide grooves 17 to receive countersunk flat head screws 18. A longitudinal slot 19 is cut in the table top 11 to extend outwardly from the hole to provide access for adjusting the set screw 16. The function of the permanent adjustable gages 13 is to provide a feedback adjustment to fine tune the correct cut angle. They also provide a pre-adjustment stop for often used angles as described hereinafter.

The primary function of the degree circle 12 is to provide a location radius for the adjustment gages 13. The radius can be any dimension, but preferably the radius would be as large as the table top would accommodate and also provide a practical adjustment mode for the adjustment gages.

The ideal device for measuring a precise angle is a very large radius protractor. With the present system, the degree circle 12 on the table top 11 acts as a very large radius protractor. On a large radius circle and with angles less than 1°, the chord and arc of the circle are practically the same.

In the described example, with a degree circle 12 having a radius of 1'-10 15/16", a ⅛° angle will equal about 0.050" on the circumference of the degree circle. If a ¼" dia. set screw with 20 threads per inch is used, then one turn of the screw will extend the screw about 0.050", or adjust the angle by ⅛°. 8 turns of the screw will equal about 1° or 0.400" (a little more than ⅜"). It should be understood that there could be a number of combinations of degree radii, screw sizes (threads per inch), and number of screw turns per degree.

Referring again to FIG. 1, there is shown a temporary clamp-on gage 14 which is releasably clamped onto the table top 11. The clamp-on gage 14 has the same cylindrical member 13 and set screw 16 as described above, but they are mounted in a flat rectangular board 20 rather than in the table top 11 and the board is clamped onto the table top by a C-clamp 21 to initially locate a permanent adjustment gage 13 or to provide a temporary gage for an angle that may not be used again. As described hereinafter, when the miter angle has been adjusted and the radial arm of the saw locked, the clamp-on gage 14 may be removed to clear the table top.

As seen in FIGS. 6, 7, and 8, a protractor device 22 is used in the present system to measure the cut angle on the workpiece against the fence F of the table top 11. The protractor device 22 is a transparent plastic 180° protractor having an adjustable radial line stop 23 pivotally mounted on its underside. The radial line stop 23 has a pointed end 24 which can be adjusted to the center point of all radial lines such that the cut edge CE of a board of any angle that rests against the stop 23 will pass through the center point. The radial line stop 23 provides a means to accurately locate the protractor 22 on the cut line CL. The radial line stop 23 can be moved to pivot from an alternate hole location 25 for angles in the left quadrant (FIGS. 6 and 7).

The protractor device 22 is used to measure the actual cut line angle CL relative to the fence F and to provide a feedback correction adjustment for the adjustment gages 13. The protractor device performs two important functions; 1) it allows the adjustment system to be independent of the radial arm mechanism of the saw, and 2) it measures the actual cut line CL on the workpiece as opposed to an assumed cut line that may not be the same as the angle set on a dial which is a part of the existing radial arm mechanism. In other words, if a precision vernier protractor were installed on the radial arm column AC of the saw, any fine adjustments would most likely be compromised or absorbed in the free play of the radial arm mechanism. The protractor device 22 circumvents the free play which normally exists between the conventional miter scale mechanism and the radial arm column and the actual cut line angle of the saw blade.

The radial line stop 23 provides a contact alignment for the back alignment point on the protractor 22. This point is difficult to align because three elements must be aligned visually; the mark line to the edge of the protractor with the cut line CL below the protractor. The radial line stop 23 allows a consistent and accurate alignment that does not depend on the visual alignment of three elements on a vertical axis. The operator can physically feel the contact of the protractor 22 at the fence F and at the cut line of the work piece with the assurance that it has not slipped from the correct position as full attention is directed to reading the angle of the cut line.

OPERATION RADIAL ARM SAW EMBODIMENT

With the table top having a degree circle (1'-10 15/16" radius) in place, a preliminary angle setting is made using the existing miter scale on the radial arm saw column.

With the radial arm mechanism locked, a trial cut is made. When making the trial cut or final cuts, a slight lateral pressure should be applied on the carriage to the left. This should eliminate most of the existing free play between the carriage handle and back through the column to the table top.

The trial cut angle is then measured with the protractor device 22. When measuring the trial cut angle, the trial board should be placed in the same position on the fence F as when it was cut. It is very important that the fence F be perfectly straight. A slight bow in the fence could influence the angle reading as the length of the board and protractor against the fence varies. The correction angle is then determined by the protractor device 22.

As shown in FIGS. 1–8, the set screw 16 of a temporary clamp-on gage 14 is positioned in the temporary gage half-way, and with the tip 16A of the screw touching the saw blade B, the temporary gage 14 is clamped onto the table top 11 with the gage in the appropriate position on the degree circle 12. The radial arm is unlocked, and moved over to allow room for adjustment of the correction angle. In other words, the temporary gage 14 is positioned on the degree circle 12 and in contact with the saw blade B such that it is aligned with the trial cut angle from which the correction adjustment angle will be made. The temporary gage 14 is then adjusted as required by turning the set screw 16 clockwise to increase the angle and counter-clockwise to decrease the angle.

With the radial arm RA unlocked, the end of the radial arm is tapped lightly with the finger to move it to the left until the saw blade B lightly contacts the tip 16A of the set screw 16. The radial arm RA is then locked and another trial cut is made. The trial cut angle is measured with th protractor 22 and, if required, another adjustment cycle is repeated. This process aids in reducing the amount of error due to free-play in the radial arm mechanism.

After the cut line angle CL has been adjusted as required, a 1/16" deep table top cut past the degree circle 12 is made with the saw. If this is a miter angle that may be used often, a permanent gage 13 may be positioned at that location in the manner previously described. If the angle may be used later, but is not worthy of a permanent gage, the 1/16" table top cut is made to the degree circle 12 and the angle is marked on the table top 11 at the intersection. The angle can then be used later by aligning the blade B on the cut line, and using a clamp-on gage 14 if required for a fine adjustment.

After several permanent gages 13 have been installed in the table top 11 and adjusted to commonly used angles, subsequent cuts are easily and quickly made by lightly tapping the end of the radial arm RA with the finger to move it to the left until the saw blade B lightly contacts the tip 16A of the gage set screw 16. The radial arm RA is then carefully locked and the radial saw is set for the final precision cut.

An adjustment cycle is performed by locking the radial arm and adjusting the gage set screw 16 to lightly contact the saw blade B. A trial cut is made and measured with the protractor 22 to determine the correction adjustment. The correction adjustment is made with the gage set screw 16. The radial arm or the cut line is re-aligned and another trial cut is made. The second trial cut is measured and the adjustment cycle is repeated if required.

The present miter cut adjustment system is similar to a vernier protractor in that it requires a primary adjustment to the nearest 1° and a separate fine adjustment with a range of about 1°. It is different from a vernier protractor in that it does not depend on a precision degree circle like a vernier scale. After the fine adjustment range has been located, the fine adjustment cycle is completely independent of the degree circle 12. This allows the degree circle 12 to be scribed on the table top with only moderate skill. The primary adjustment can be initially made with the existing miter scale on the radial arm column, or on a less than accurate degree circle calibrated with 1° marks. The accuracy of the fine adjustment cycle is not influenced by a less than accurate degree circle.

Because the fine adjustment cycle occurs on a large radius degree circle and the angle involved is very small relative to the radius, the present miter gage apparatus has an adjustment leverage which provides a sensitive and precise angular adjustment from a low cost gage with a moderately low skill installation. If a more precise angle is required, the adjustment cycle can be repeated at a closer range and with a more enhanced adjustment leverage.

Locating the adjustment gages 13 or 14 on a large radius arc provides a very desirable adjustment leverage. For example, to make an adjustment of ¼° on the large radius arc, the adjustment gage would have to move 3/32" or 2 turns of the screw 16. To make the same adjustment on a conventional column mounted miter scale, the pointer would have to move 0.008" or 1/128" to accomplish a ¼° adjustment. The present system can easily make adjustments of ¼° with 1 turn of the gage set screw.

The present apparatus provides a means to obtain and store for instant recall, plain and compound angles from 90° to greater than 45° in ¼° increments to a tolerance of ±1/16°. This can be increased to ¼° increments at a tolerance of ±1/16° if one degree on the protractor device 22 is divided into four parts.

DESCRIPTION OF A PREFERRED EMBODIMENT FOR TABLE SAWS

Referring to FIGS. 9-15 of the drawings, there is shown another embodiment of the miter gage apparatus 30 which may be provided as a ready made unit for use in performing precise angular cuts on table saws, band saws, router table, or other woodworking machinery having an existing miter gage. The miter gage apparatus 30 for use with the table saw comprises four major components; a flat base 31 having an arc or degree circle 32 cut therein, a protractor miter gage 39, one or more permanent adjustable gages 56, and one or more clamp-on adjustable gages 63.

The table saw miter gage apparatus 30 utilizes the same basic adjustment and operation principles as the previously described radial arm saw embodiment. The permanent and temporary gages perform essentially the same functions as the previously described permanent and temporary gages. The protractor device 22 is the same. The base 31, similar to the previously described table top 11, serves as the flat surface for the location of the large degree circle and mounting surface for the permanent and temporary gages. It also provides a device which allows the protractor gage 39 to be quickly and repeatedly clamped to an exact location on the base 31 from which the miter angles are adjusted. However, the base 31 of the table saw embodiment is independent from the woodworking machine and may be stored away when not in use.

The base 31 of the miter gage apparatus 30 is a flat arcuate member having a flat edge 33 on the side opposite the arcuate side 34 and flat edges 35 at each end. A 1/16" deep groove is cut in the top surface of the base 31 on a relatively large radius radially inward from the arcuate side 34. A preferred radius is suggested to be 1'-2 5/16". The groove forms an arc or degree circle 32 on which the adjustable gages 56 and 63 will be located. The radius can be any dimension, but preferably the radius would be as large as the base would accommodate and also provide a practical adjustment mode for the adjustment gages.

Referring to FIGS. 14 and 15, a slot 36 is cut into the base 31 spaced inwardly and parallel to the flat edge 33. The slot 36 extends inwardly from one flat side 35 approximately ⅓ of the length of the flat edge 33. A pair of rounded metal or plastic contact points 37 project a short distance from one side wall of the slot 36 in longitudinally spaced relation. A stop member 38 projects upwardly from the bottom of the slot 36 near its end. A protractor miter gage assembly 39 is slidably carried in the slot 36.

The protractor miter gage 39 has a vertical head piece 40 and a horizontal arcuate protractor portion 41. The head piece 40 is rotatably pinned to the top surface of a rectangular metal miter bar 42. The miter bar 42 is slidably received in the slot 36 and moves longitudinally therein with one side engaged on the contact points 37 and one end engaged on the stop member 38 to keep it in the same location each time. An arcuate slot 43 is formed in the horizontal protractor portion 41 radially inward from its outer edge. A locking handle 4 is received through the slot 43 and threadedly engaged in the miter bar 42 such that loosening the handle allows the protractor to rotate and tightening the handle locks the protractor against rotational movement.

As best seen in FIGS. 15 and 16, a plunger mechanism 45 disposed at one side of the slot 36 is operated by a lever 46 to engage and disengage the miter bar 42 in a clamping action. An aperture 47 extends inwardly from the flat edge 33 to the slot 36. A plunger member 48 is slidably received in the aperture 47 and has a threaded bore 49. A pivot block 50 is secured on the flat edge 33 at the open end of the aperture 47. A rectangular lever member 46 has one end disposed adjacent the pivot block 50 and extends outwardly therefrom parallel to the flat edge 33 with a space therebetween. An elongate screw 51 extends through a hole 52 in the pivot block 50 and a hole 53 near the end of the lever member 46 and its threaded shank is threadedly received in the threaded bore 49 of the plunger 48. The outer end or head 54 of the screw 51 is engaged on the outer side of the lever member 46. A compression spring 55 is received on the shaft of the screw 51 with one end engaged on the end of the plunger member 48 and its opposed end engaged on the pivot block 50 to bias the forward end of the plunger 48 against the side edge of the miter bar 42 and the head 54 of the screw 51 against the outer side of the lever member 46.

Another hole 56 spaced longitudinally from the hole 53 is formed through the lever member and receives a stop screw 57 which is threadedly secured into the flat edge 33 of the base 31.

As seen in FIG. 16, the upper corner of the pivot block 50 serves as a pivot point and the lever 46 serves as a fulcrum. When the extended end of the lever is pushed inward toward the flat edge 33, as seen in dotted line the lower end of the lever 46 retracts the plunger 48 and allows the miter bar 42 to slide in the slot 36 and releasing the upper end of the lever allows the spring 55 to urge the plunger 48 forward and engage side of the miter bar 42 to clamp it against sliding movement. Turning the threaded screw 51 relative to the plunger 48 allows for fine adjustment of the plunger travel.

Referring again to FIG. 9, a generally rectangular fence member F is releasably clamped at one end to the protractor head piece 40 by a pair of bolts having wing nuts 54 which extend through the head piece and are received in slots 55 in the fence member F. The fence member F slides laterally relative to the head piece 40, as indicated in dotted line in FIG. 9.

As seen in FIGS. 9 and 10, one or more adjustable gages 56 are secured to the base 31 at circumferentially spaced locations. Each adjustable gage 56 has flat base portion 57 and an upstanding portion 58. Each gage 56 is secured to the base 31 by a screw 59 threadedly secured to the base member and having its threaded shank extending upwardly from the top surface of the base. A wing nut 60 received on the screw shank 59 above the base 57 allows the gage 56 to be pivotally rotated about the screw 59 and secured in a selective position. A threaded bore extends horizontally through the upstanding portion 58 and a set screw 61 is threadedly received in the threaded bore to extend outwardly from each side of the upstanding portion 58 of the adjustment gage 56. A preferred set screw 61 is a #8 diameter screw with 32 threads per inch having a rounded tip at one end and an allen wrench socket or screw driver slot 62 at the other end. The function of the adjustable gages 56 is to provide a feedback adjustment to fine tune the correct angle of the fence F. They also provide a preadjustment stop for often used angles as described hereinafter.

Referring now FIGS. 12 and 13, there is shown a temporary clamp-on gage 63 which is releasably clamped onto the base 31. The clamp-on gage 63 has the same flat base 57 and upright 58 portion and set screw 61 as described above, but they are mounted on a flat rectangular member 64 rather than in the base 31 and the rectangular member 64 extends outwardly beyond the end of the base 57 and is clamped onto the base 31 by a C-clamp 21 to initially locate a permanent adjustment gage 56 or to provide a temporary gage for an angle that may not be used again. The upstanding screw 59 is threadedly secured through the rectangular member 64 and extends upwardly through the base 57. As described hereinafter, when the miter angle has been adjusted, the clamp-on gage 63 may be removed to clear the table top.

The primary function of the degree circle 32 is to provide a location radius for the adjustment gages 56 and 63. The radius can be any dimension, but preferably the radius would be as large as the table top would accommodate and also provide a practical adjustment mode for the adjustment gages.

The ideal device for measuring a precise angle is a very large radius protractor. With the present system, the degree circle 32 on the base 31 acts as a very large radius protractor. On a large radius circle and with angles less than 1°, the chord and arc of the circle are practically the same.

In the described example, with a degree circle 32 having a radius of 1'-2 5/16", then a $\frac{1}{8}$° angle will equal about 0.03125" on the circumference of the degree circle. If a #8 diameter set screw with 32 threads per inch is used, then one turn of the screw will extend the screw about 0.03125" or adjust the angle by $\frac{1}{8}$°. 8 turns of the set screw will equal about 1° or 0.250" (approximately $\frac{1}{4}$"). It should be understood that there could be a number of combinations of degree radii, set screw sizes (threads per inch), and number of screw turns per degree.

OPERATION TABLE SAW EMBODIMENT

Although the miter gage apparatus 30 is illustrated in the example as being used with a table saw, it can also be used for making precise angular cuts with band saws, router tables, or other woodworking machinery having an existing miter gage. A preliminary angle setting is made using the existing miter gage scale on the protractor miter gage 39. Using the protractor miter gage 39 and its scale, a trial cut is made with the table saw, band saw, router table, or other woodworking machine having an existing miter gage. The trial cut angle is then measured relative to the fence F with the protractor device 22 (FIGS. 6 and 7) and the correction angle is determined.

Referring now to FIGS. 9, 15, and 16, the lever 46 is pressed inward to retract plunger 48 relative to the base 31 and the protractor miter gage bar 42 is inserted into the slot 36 and engaged on contact points 37 with the end of the bar engaged on stop member 38. The lever 46 is released and the plunger 48 is extended by the spring 55 to securely clamp the miter gage bar 42 in the correct position in the slot 36 on the base 31.

A temporary clamp-on gage 63 or a permanent gage 56 is positioned near the outer end of the protractor fence F within the adjustable range of the gage set screw 61. The wing nut 60 is loosened and the gage body 57 is pivoted about the screw 59 until the tip of the gage set screw 61 contacts the fence F, and the wing nut is tightened. The temporary clamp-on gage 63 or permanent gage 56 is now aligned with the trial cut angle from which the correction adjustment angle will be made.

The miter gage locking handle 44 is loosened and the fence F is swung away to allow adjustment of the gage set screw 61. The gage 56 or 63 is then adjusted as required by turning the set screw 61 clockwise to increase the angle or counter-clockwise to decrease the angle. The set screw 61 is turned ½ rotation for a 1/16° adjustment, 1 full rotation for a ⅛° adjustment, and 2 rotations for a ¼° adjustment, etc.

The fence F is then swung back around so that it contacts the set screw 61 and aligns with the adjusted miter angle. The locking handle 44 is tightened and the lever 46 is pressed inward to retract the plunger 48 and the protractor gage 39 is removed from the base 31.

Using these settings, another trial cut is made and measured to determine the accuracy, and if necessary, the adjustment cycle is repeated. In most cases, only one adjustment cycle is required for tolerances to ±¼°. For tolerances of ±1/16°, the permanent adjustable gage 13 should be used. For angles that are rarely used and/or for moderate tolerances, the angle can still be stored by making a pencil line on the surface of the base 31 along the side of the fence F and extending across the degree circle 32. The angle in degrees should be indicated by pencil at the end of the mark. The pencil line angle is accurate to about ±¼°. If the degree circle 32 has a radius of 1'-2 5/16", then an angle of ⅛° will be equal to 1/32" on the degree circle. If the edge of the fence F is aligned within that 1/32" measurement, then the retrieved angle will have a tolerance of at least ±⅛°.

Subsequent cutting angles can be easily and quickly retrieved from the miter gage apparatus 30 by loosening the locking handle 44, clamping the protractor miter gage 39 onto the base 31, rotating the fence F to contact the appropriate gage set screw 61, and then tightening the handle 44. For angles with less exacting tolerances, the fence F can be aligned with the appropriate pencil line mark. The tolerance can be improved on the pencil line angle by clamping on a temporary gage 63 and performing an adjustment cycle.

While this invention has been described fully and completely with special emphasis upon a preferred embodiment, it should be understood that within the scope of the appended claims the invention may be practiced otherwise than as specifically described herein.

I claim:

1. An adjustable miter gage apparatus for making precision miter cuts with existing woodworking machines of the type having a saw blade and an angular positioning member for positioning the saw blade relative to a workpiece or the workpiece relative to the saw blade to make angular cuts in the workpiece, the miter gage apparatus comprising;

a flat base member having a large radius arc scribed thereon, and one or more adjustable gages adapted to be positioned at selective locations on the circumference of said arc and each having an extensible and retractable stop means movably mounted therein, the movement of said stop means calibrated relative to said arc radius such that extending or retracting said stop means a predetermined distance corresponds to a fraction of a degree on said arc, whereby after a preliminary angular cut is made using the existing angular positioning mechanism on the woodworking machine and the angular difference between the actual cut and the desired angle is determined, one of said adjustable gages is positioned on said arc with its stop means in contact with the saw blade or the angular positioning mechanism and said stop means is adjustably extended or retracted a distance corresponding to the angular difference, and thereafter, said adjustable gage is secured at the corrected angle location on said arc and locked into the corrected angular position relative to the saw blade or the angular positioning mechanism such that subsequent precision cuts may be made by positioning the saw blade or the angular positioning mechanism against the adjusted stop means prior to making a cut.

2. An adjustable miter gage apparatus according to claim 1 wherein said adjustable gage extensible and retractable stop means is a set screw threadedly mounted therein and said set screw threads and said arc radius being related such that turning said set screw will extend or retract said set screw a distance corresponding to a fraction of a degree on said arc.

3. An adjustable miter gage apparatus according to claim 2 wherein said adjustable gage is a cylindrical member having a threaded bore extending transversly therethrough, and said set screw is threadedly received in said threaded bore and has at least one end extending outwardly from the side wall of said cylindrical member and having rotating means at said one end for rotating said set screw.

4. An adjustable miter gage apparatus according to claim 3 wherein said adjustable gage threaded bore extends transversly through said cylindrical member at an angle relative to a horizontal plane.

5. An adjustable miter gage apparatus according to claim 3 wherein said base member is apertured at predetermined locations on said large radius arc, and said cylindrical member is secured in said aperture.

6. An adjustable miter gage apparatus according to claim 3 wherein said adjustable gage is a temporary gage comprising a rectangular member apertured at one end to receive said cylindrical member and adapted at its other end to be removably attached to said base member, and said cylindrical member is secured in said aperture, whereby said rectangular member may be selectively positioned on said base member to place said cylindrical member at predetermined locations on said large radius arc.

7. An adjustable miter gage apparatus according to claim 2 wherein said adjustable gage comprises a flat base portion rotatably mounted on said base member and an upstanding portion having a threaded aperture, a set screw threadedly received in said threaded aperture to extend outwardly from each side of said upstanding portion, and locking means connected with said gage base portion for locking same against rotational movement at selective positions.

8. An adjustable miter gage apparatus according to claim 1 including a transparent 180° protractor device having a straight edge with a center point and an arc divided into fractional degree increments and an adjustable radial line stop member pivotally mounted on its underside, said radial line stop member having an outer end which can be adjusted to engage the cut edge of a workpiece such that the saw cut will pass through the center point of said protractor to accurately determine the angle of the saw cut.

9. An adjustable miter gage apparatus according to claim 1 wherein said base member is adapted to be installed on a radial arm saw frame to serve as the table top for the radial arm saw and the radial center of said large radius arc is located at the approximate center of the radial arm column of the radial arm saw machine.

10. An adjustable miter gage apparatus according to claim 1 in which;

said flat base member is an arcuate configuration having an outwardly arcuate side edge and a flat edge on the opposite side and flat edges at each end with said large radius arc scribed in the top surface of said flat base radially inward from said arcuate side and a slot formed into the top surface of said base spaced inwardly and parallel to said flat side edge, and including;

a protractor miter gage assembly removably carried in said slot and slidable longitudinally therein, said protractor miter gage assembly comprising a rotatable head piece having a flat vertical portion and a horizontal arcuate protractor portion extending radially outward from the lower portion thereof and locking means connected with said protractor miter gage assembly for selectively locking same in selected angular positions on said base member.

11. An adjustable miter gage apparatus according to claim 10 including an elongate generally rectangular fence member removably secured at one end to said head piece flat vertical portion to rotate therewith and its other end extending outwardly across said large radius arc to selectively engage said adjustable gage stop means, and said adjustable gage stop means being selectively extended or retracted to more precisely position the outer end of said fence member in a desired angular position.

12. An adjustable miter gage apparatus according to claim 10 in which said protractor miter gage assembly is rotatably mounted on a flat rectangular bar, and said rectangular bar is slidably received in said slot to move longitudinally therein.

13. An adjustable miter gage apparatus according to claim 12 including a first set of contact members disposed in one side wall of said slot to protrude a short distance from said side wall of said slot in longitudinally spaced relation and a second contact member disposed in one end wall of said slot to protrude a short distance inwardly therefrom, and said flat rectangular bar slidably received in said slot to move longitudinally therein with one side engaged on said first set of contact members and one end engaged on said second contact member.

14. An adjustable miter gage apparatus according to claim 12 including locking means on said base member selectively engageable with said rectangular bar to clamp same into said slot and prevent longitudinal movement thereof.

15. A method of making precision miter cuts with existing woodworking machines of the type having a saw blade and a radial arm member for positioning the saw blade relative to a workpiece to make angular cuts in the workpiece, comprising the steps of;

providing an adjustable miter gage apparatus including a flat base member having a large radius arc scribed thereon and one or more adjustable gages adapted to be positioned at selective locations on the circumference of said arc and each having an extensible and retractable stop means movably mounted therein which is calibrated relative to said arc radius such that extending or retracting said stop means a predetermined distance corresponds to a fraction of a degree on said arc, making a trial angular cut in the workpiece using the existing radial arm positioning mechanism on the woodworking machine, measuring the trial cut angle with a protractor device and determining the angular difference between the actual cut angle and the desired cut angle, positioning and securing one of said adjustable gages on said arc with its stop means in contact with the saw blade and then moving the saw blade away from said stop means adjusting said stop means by extending or retracting it a distance corresponding to the angular difference, moving the saw blade back into engagement with said stop means and locking the radial arm mechanism into the corrected angular position, making a second trial angular cut in the workpiece with the radial arm mechanism locked in the corrected angular position, measuring the second trial cut angle with a protractor device and determining the angular difference between the actual second trial cut angle and the desired cut angle and, if required, repeating the steps of adjusting said stop means and moving the saw blade back into engagement with said stop means and locking the radial arm mechanism into the corrected angular position until the desired degree of accuracy is obtained and marking the position of the adjustable gage on the arc, and thereafter to make subsequent precision angular cuts, positioning the saw blade against the adjusted stop means and locking the radial arm mechanism at the corrected angle location prior to making a cut.

16. A method of making precision miter cuts with existing woodworking machines of the type having a saw blade and a miter gage for positioning and feeding a workpiece relative to the saw blade to make angular cuts in the workpiece, comprising the steps of;

providing an adjustable miter gage apparatus including a flat base member having a large radius arc scribed thereon and one or more adjustable gages adapted to be positioned at selective locations on the circumference of said arc and each having an extensible and retractable stop means movably mounted therein which is calibrated relative to said arc radius such that extending or retracting said stop means a predetermined distance corresponds to a fraction of a degree on said arc, providing a protractor miter gage apparatus on said base member which has rotatable head piece with a flat vertical portion, a horizontal arcuate protractor portion extending radially outward from th lower portion thereof, locking means connected with said protractor miter gage apparatus for selectively locking same in selected angular positions on said base member, an elongate generally rectangular fence member removably secured at one end to said head piece flat vertical portion to rotate therewith and its other end extending outwardly across said large radius arc to selectively engage said adjustable gage stop means, making a trial angular cut in the workpiece using the protractor miter gage apparatus, measuring the trial cut angle with a protractor device and determining the angular difference between the actual cut angle and the desired cut angle, positioning and securing one of said adjustable gages on said arc near the outer end of said fence member with its stop means in contact with the outer end of said fence and then moving said fence away from said stop means, adjusting said stop means by extending or retracting it a distance corresponding to the angular difference, moving said fence back into engagement with said stop means and locking said head piece into the corrected angular position, making a second trial angular cut in the workpiece with said head piece locked in the corrected angular position, measuring the second trial cut angle with a protractor device and determining the angular difference between the actual second trial cut angle and the desired cut angle and, if required, repeating the steps of adjusting said stop means and moving said fence back into engagement with said stop means and locking said head piece into the corrected angular position until the desired degree of accuracy is obtained and marking the position of the adjustable gage on the arc, and thereafter to make subsequent precision angular cuts, positioning said fence against the adjusted stop means and locking said head piece at the corrected angle location prior to making a cut.

* * * * *